(12) United States Patent
Piparsaniya

(10) Patent No.: US 12,077,199 B2
(45) Date of Patent: Sep. 3, 2024

(54) MONITORING OF BARRIER GATES AT LEVEL CROSSINGS

(71) Applicant: Siemens Mobility, Inc., New York, NY (US)

(72) Inventor: Harsh Piparsaniya, Maharashtra (IN)

(73) Assignee: Siemens Mobility, Inc., New York, NY (US)

( * ) Notice: Subject to any disclaimer, the term of this patent is extended or adjusted under 35 U.S.C. 154(b) by 957 days.

(21) Appl. No.: 17/038,587

(22) Filed: Sep. 30, 2020

(65) Prior Publication Data

US 2022/0097746 A1 Mar. 31, 2022

(51) Int. Cl.
| | |
|---|---|
| *B61L 29/22* | (2006.01) |
| *B61L 15/00* | (2006.01) |
| *B61L 25/02* | (2006.01) |
| *B61L 27/70* | (2022.01) |
| *G06T 7/70* | (2017.01) |
| *G06V 20/56* | (2022.01) |
| *H04N 5/38* | (2006.01) |
| *H04N 23/54* | (2023.01) |

(52) U.S. Cl.
CPC ............ *B61L 29/22* (2013.01); *B61L 15/0018* (2013.01); *B61L 25/025* (2013.01); *B61L 27/70* (2022.01); *G06T 7/70* (2017.01); *G06V 20/56* (2022.01); *H04N 5/38* (2013.01); *H04N 23/54* (2023.01); *B61L 15/0054* (2013.01); *B61L 2201/00* (2013.01); *G06T 2207/30252* (2013.01)

(58) Field of Classification Search
CPC .. B61L 15/00; B61L 15/0018; B61L 15/0054; B61L 25/00; B61L 25/02; B61L 25/025; B61L 25/06; B61L 27/40; B61L 27/70; B61L 29/04; B61L 29/08; B61L 29/18; B61L 29/22; B61L 2201/00; B61L 2205/04; G06T 7/70; G06T 2207/30252; G06V 25/56; G06V 20/56; H04N 5/38; H04N 23/54
See application file for complete search history.

(56) References Cited

U.S. PATENT DOCUMENTS

| | | | | |
|---|---|---|---|---|
| 9,440,666 | B2* | 9/2016 | DeSanzo | B61K 9/00 |
| 10,457,306 | B2* | 10/2019 | Cho | B61L 27/53 |
| 2010/0213321 | A1* | 8/2010 | Kane | B61L 25/025 246/167 R |
| 2011/0285842 | A1* | 11/2011 | Davenport | B61L 27/40 348/116 |
| 2014/0277824 | A1* | 9/2014 | Kernwein | B61K 9/08 701/1 |
| 2015/0201165 | A1* | 7/2015 | Bocionek | H04N 7/181 348/148 |
| 2017/0313332 | A1* | 11/2017 | Paget | B61L 25/025 |

* cited by examiner

*Primary Examiner* — Zachary L Kuhfuss
*Assistant Examiner* — Cheng Lin
(74) *Attorney, Agent, or Firm* — Lempia Summerfield Katz LLC

(57) ABSTRACT

An end-of-train device, a system, and a method for monitoring barrier gates are provided. The method includes receiving at least one image associated with a barrier gate from an imaging device mounted on a train. Further, the at least one image is analyzed to determine a current status of the barrier gate. The current status corresponds to a position associated with the barrier gate. Based on the current status of the barrier gate, an action to be performed is identified. Further, one or more instructions for performing the identified action are generated.

17 Claims, 3 Drawing Sheets

MONITORING OF BARRIER GATES AT LEVEL CROSSINGS

FIELD

The present embodiments relate to monitoring of barrier gates and, more specifically, to monitoring of barrier gates based on images received from trains.

BACKGROUND

Level crossings are intersections between a railway track and a road that help in providing a safe passage of road traffic across the railway track. In many parts of the world, level crossings are provided with a barrier gate in order to prevent road traffic and pedestrians from crossing the railway track when a train is approaching. The barrier gate is actuated by a track circuit provided on the railway track, provided at a certain distance from the level crossing. More specifically, when the train passes over the track circuit, closure of the barrier gate is initiated. Similarly, another track circuit is configured to initiate opening of the barrier gate when the train has crossed level crossing. However, faults in the track circuit or in a control circuitry of the barrier gate may lead to malfunctioning of the barrier gate. As a result, the barrier gate may remain in open position or get stuck between an open position and a closed position. Such incidents at unmanned level crossings, for example, may jeopardize human lives.

SUMMARY

In light of the above, there exists a need for a mechanism for remote monitoring of barrier gates, for initiating timely maintenance operations.

Aspects of the present disclosure relate to monitoring of barrier gates. In an aspect, an end-of-train device is disclosed. The end-of-train device includes an imaging device configured to capture at least one image associated with a barrier gate in a vicinity of a train on which the end-of-train device is mounted. The at least one image is analyzed to determine a current status of the barrier gate. The end-of-train device further includes a location tracking device configured to determine a location of the train in real-time. The location of the train is used to determine an identity of the barrier gate.

In another aspect, a system for monitoring barrier gates is disclosed. The system includes an imaging device mounted on a train. The imaging device is configured to capture images associated with an environment of the train. The system further includes a subsystem communicatively coupled to the imaging device, configured via executable instructions to receive at least one image associated with a barrier gate from the imaging device. The subsystem is further configured to analyze the at least one image to determine a current status of the barrier gate. The current status corresponds to a position of the barrier gate. The subsystem is further configured to identify an action to be performed based on the current status of the barrier gate. The subsystem is further configured to generate one or more instructions for performing the identified action.

In yet another aspect, a method for monitoring barrier gates is disclosed. The method includes receiving, by a processing unit, at least one image associated with a barrier gate. The at least one image is received from an imaging device mounted on a train. The method further includes analyzing the at least one image, by the processing unit, to determine a current status of the barrier gate. The current status corresponds to a position of the barrier gate. The method further includes identifying, by the processing unit, an action to be performed based on the current status of the barrier gate. The method further includes generating, by the processing unit, one or more instructions for performing the identified action.

DETAILED DESCRIPTION

Figure 1:
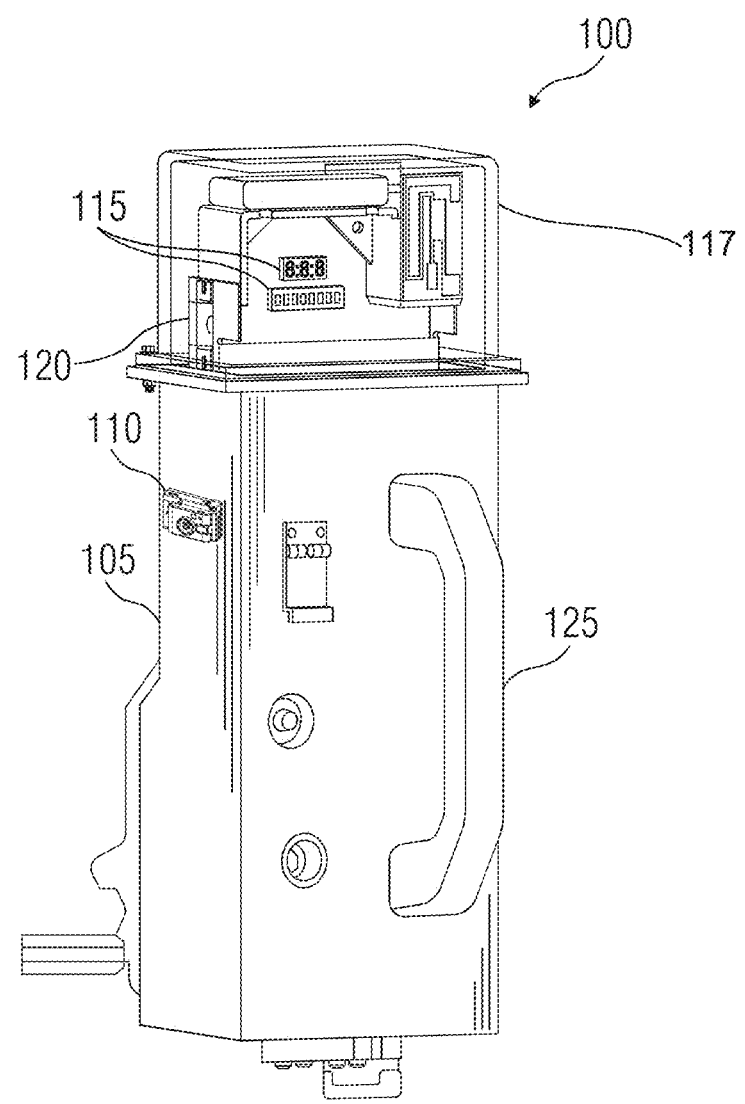
FIG. 1 shows a schematic view of an End-of-Train device, in accordance with an exemplary embodiment.

Various embodiments of the present invention are described with reference to the drawings, where like reference numerals are used in reference to the drawings. Like reference numerals are used to refer to like elements throughout. In the following description, numerous specific details are set forth in order to provide a thorough understanding of embodiments. These specific details need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is no intent to limit the disclosure to the particular forms disclosed. Instead, the disclosure is to cover all modifications, equivalents, and alternatives falling within the scope of the present invention.

FIG. 1 shows a schematic view of an End-of-Train (EOT) device 100, in accordance with an exemplary embodiment. The EOT device 100 includes an enclosure 105. The enclosure 105 may be made of, for example, plastic, metal, or an alloy. The enclosure 105 includes a provision to fit an imaging device 110. The imaging device 110 includes one or more cameras configured for capturing images associated with an environment of a train on which the EOT device 100 is mounted. The term 'train' as used herein may refer to any rail vehicle used in mass transit, mainline transit, or freight transportation over a railway track. In the present embodiment, the imaging device 110 is a 360 degree camera configured for high speed imaging. In another embodiment, the imaging device 110 includes two separate high speed cameras mounted diagonally opposite to each other on the enclosure 105 of the EOT device 100, to capture images on either side of the train.

The EOT device 100 further includes one or more displays 115 housed in a transparent dome 117 provided on top of the enclosure 105. The transparent dome 117 may be made of, for example, plastic or glass. The one or more displays 115 display information and/or data provided by the EOT device 100. The EOT device 100 further includes a High Visibility Marker light (HVM) 120 used to illuminate a rear end of the railway vehicle. The EOT device 100 is coupled to the rear-end of the train using a coupling unit (not shown) attached to the enclosure 105. The EOT device 100 further includes a handle 125 attached to the enclosure 105 for handling such as installation and removal of the EOT device 100 on/off a train car of a railway vehicle (e.g., a last train car).

In addition to the above, the EOT device 100 may also include other components such as cell phone transceivers, systems for monitoring/controlling brake lines, communication systems for communicating with other units such as Head-of-Train (HOT) devices, and the like. A person having ordinary skill in the art is familiar with structure, components, and functions of different types of EOT devices, and therefore, these aspects will not be described in further detail herein.

Figure 2:
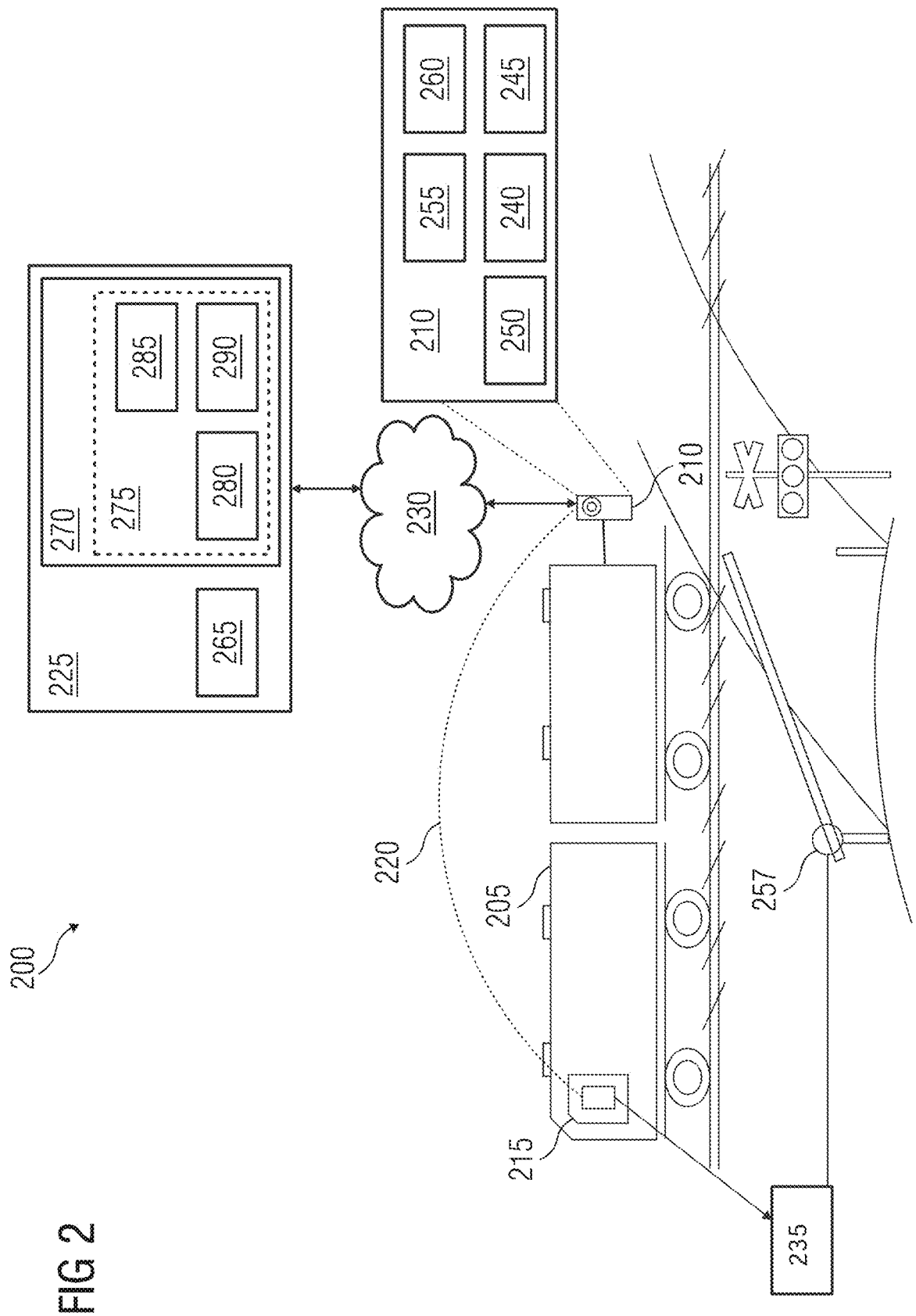
FIG. 2 illustrates a block diagram of a system for monitoring barrier gates, in accordance with an embodiment.

FIG. 2 illustrates a block diagram of a system 200 for monitoring barrier gates, in accordance with an embodiment. The system 200 includes an End-of-train telemetry (EOTT) system associated with a train 205. The EOTT system includes an EOT device 210, similar to the EOT device 100, and a Head-of-Train (HOT) device 215 communicatively coupled to the EOT device 210 over a telemetry link 220. The EOT device 210 is further communicatively coupled to a remote server 225 over a network 230. The remote server 225 is located at a remote location (e.g., at a railway station). In an embodiment, the network 230 is a wireless network such as a Global System for Mobile (GSM) communications network. The HOT device 215 is configured to communicate with wayside equipment and one or more control stations 235 along the route of the train 205.

In an embodiment, the one or more control stations 235 include an Operator Control System (OCS). The OCS enables an operator to monitor and provide instructions for planning, dispatching, and operating of trains, track equipment, and wayside equipment in a specific route. The OCS is further configured to indicate a status associated with barrier gates at level crossings along the route. In a further embodiment, the OCS may be configured to provide control signals for operating the barrier gates. The functions associated with OCS include, but are not limited to, route setting, live-tracking of trains, time-table management, and regulation of rail traffic. As the functions of an OCS are familiar to a person skilled in the art, these are not described in detail herein. In an embodiment, the HOT device 215 communicates with the one or more control stations 235 through wayside interface units (WIUs).

The EOT device 210 includes a location tracking device 240. In an embodiment, the location tracking device 240 may be a navigation device based on a satellite navigation system. In an example, the location tracking device 240 is a Global Positioning System (GPS) based navigation device configured to receive GPS signals from a GPS satellite (not shown).

The system 200 further includes an imaging device 245. In the present embodiment, the imaging device 245 is similar to the imaging device 110 and forms part of the EOT device 210. The imaging device 245 is a 360 degree camera adapted for high speed imaging. In an embodiment, the imaging device 245 may continuously capture images associated with the environment of the train 205, for example, as a video. In another embodiment, the imaging device 245 may capture images based on predefined rules. For example, the imaging device 245 may capture the images over predefined intervals of time. In yet another embodiment, the imaging device 245 may be triggered to capture images based on a location of the train 205 determined by the location tracking device 240. The imaging device 245 is triggered when the train 205 is approaching a GPS location of a barrier gate. For example, the imaging device 245 is triggered when the train 205 is at a certain distance to the barrier gate.

The EOT device 210 further includes a first processing unit 250 and a first memory 255 communicatively coupled to the first processing unit 250. The first processing unit 250 may include any type of computational circuit, such as, but not limited to, a microprocessor, microcontroller, application specific integrated circuits, single-chip computers, and the like. The first memory 255 may include one or more of a volatile memory and a non-volatile memory. The first memory 255 may be coupled for communication with the first processing unit 250. The first processing unit 250 may execute instructions and/or code stored in the first memory 255. The first memory 255 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. The first memory 255 includes machine-readable instructions that, when executed by the first processing unit 250, causes the first processing unit 250 to generate image data corresponding to a location of the train 205. More specifically, the EOT device 210 is configured to generate image data suitable for processing at the remote server 225, from the output of the imaging device 245.

In an embodiment, the EOT device 210 may preprocess the images before transmitting to the remote server 225. Each of the images may be preprocessed using techniques including, but not limited to, image compression, contrast adjustment, intensity adjustment, histogram equalization, binarization and morphological operations. In an embodiment, the images are preprocessed based on acceleration data associated with the train 205. The acceleration data is received from an accelerometer associated with the EOT device 210. In an embodiment, the acceleration data is used to determine a speed, tilt, or curve radius associated with the train. The images are further corrected or aligned based on the speed, tilt, or curve radius. In an embodiment, the EOT device 210 is further configured to determine if a barrier gate is present in the image. For example, an object recognition algorithm may be employed for determining the presence of the barrier gate in the image. The object recognition algorithm may employ a convolutional neural network (CNN) trained based on a plurality of images including barrier gates, to detect the presence of barrier gates in any given image. If the presence of a barrier gate 257 is detected from the image, the EOT device 210 selects the image for transmission to the remote server 225.

The EOT device 210 is further configured to generate location data associated with the train 205, in real-time, based on an output of the location tracking device 240. For example, the location data may include GPS coordinates associated with the EOT device 210, generated based on GPS signals received by the location tracking device 240. The image data and the location data are further transmitted to the remote server 225 through the network 230. More specifically, a communication unit 260 associated with the EOT device 210 enables transmission of the image data and the location data to the remote server 225 over the network 230. In an implementation, the image data and the location data may be time-stamped, to indicate association between an image and corresponding location.

In an embodiment, the EOT device 210 may include a storage unit (not shown) including a local database. The storage unit may include, but is not limited to, storage disks, Secure Digital (SD) cards, and external flash memory. The local database stores image data and location data locally if the communication unit 260 is unable to connect to the network 230. In another embodiment, the image data and the location data are collected and stored in the local database for a predefined period of time (e.g., 5 seconds). The image data and the location data in the local database is further transmitted as data bursts when the predefined period of time lapses.

The remote server 225 may be a real or a virtual group of computers (the technical term for a real group of computers is "cluster", the technical term for a virtual group of computers is "cloud"). The remote server 225 further includes a second processing unit 265 and a second memory 270. The second processing unit 265 may include any type of computational circuit such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The second processing unit 265 may also include embedded controllers, such as generic or programmable logic devices or arrays, application specific integrated circuits, single-chip computers, and the like. In general, the second processing unit 265 may include hardware elements and software elements.

The second memory 270 may include one or more of a volatile memory and a non-volatile memory. The second memory 270 may be coupled for communication with the second processing unit 265. The second processing unit 265 may execute instructions and/or code stored in the second memory 270. A variety of computer-readable storage media may be stored in and accessed from the second memory 270. The second memory 270 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. The second memory 270 includes a gate monitoring module 275 that may be stored in the second memory 270 in the form of machine-readable instructions and executable by the second processing unit 265. These machine-readable instructions, when executed by the second processing unit 265, cause the second processing unit 265 to determine status of barrier gates in a vicinity of the train 205 based on the image data received from the EOT device 210.

The gate monitoring module 275 includes an analysis module 280, an action identification module 285, and an instruction generation module 290. The analysis module 280 is configured to analyze the at least one image received from the EOT device 210 to determine a current status of the barrier gate. The term 'current status', as used herein, refers to a position of the barrier gate. The action identification module 285 is configured to identify an action to be performed based on the current status of the barrier gate. The instruction generation module 290 is configured to generate one or more instructions for performing the identified action. In addition to the above, the second memory 270 may further include a database for storing information associated with identities and locations associated with a plurality of barrier gates. Further, the database may also include information associated with the control stations 235 corresponding to each of the barrier gates. Further, the database may also store latest images and statuses associated with each of the barrier gates.

Figure 3:
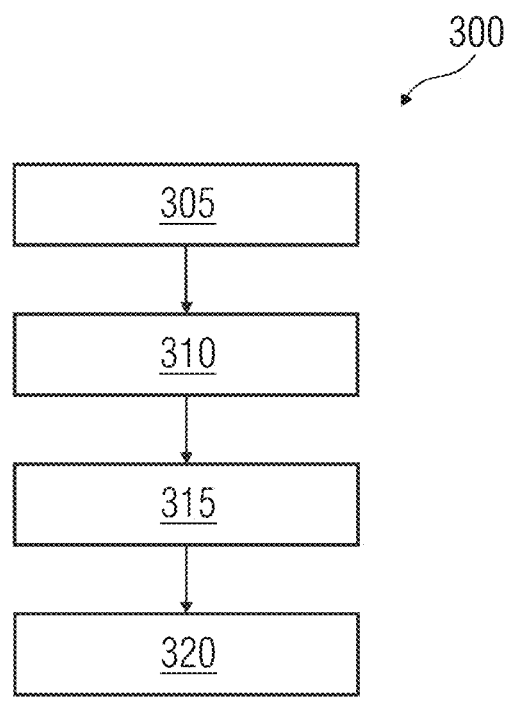
FIG. 3 depicts a flowchart of a method for monitoring barrier gates, in accordance with an embodiment.

FIG. 3 depicts a flowchart of a method 300 for monitoring barrier gates, in accordance with an embodiment. The method 300 is implemented using the remote server 225. At act 305, at least one image associated with a barrier gate 257 is received, by a subsystem, from an imaging device mounted on the train 205. In the present embodiment, the at least one image is received from the imaging device 245, which is integrated with the EOT device 210, and the remote server 225 acts as the subsystem. The at least one image is preprocessed by the EOT device 210 to generate image data suitable for transmission to the remote server 225.

At act 310, the at least one image is analyzed to determine a current status of the barrier gate 257. The current status corresponds to a position of the barrier gate 257. In an example, the current status may be one of closed, opened, and stuck. The term 'stuck', as used herein, may refer to any position other than opened or closed. In an embodiment, the image is analyzed by first, determining an identity of the barrier gate 257 based on the location of the train 205. For example, a unique identification number associated with the barrier gate 257 is identified from a database. The database may include location information corresponding to a plurality of barrier gates along the route of the train. The unique identification number is identified from the database based on the location data.

Upon determining the identity of the barrier gate 257, one or more pre-existing images associated with the barrier gate 257 are identified from the database. The pre-existing images may be captured by imaging devices on other trains that have crossed the route earlier. For example, if a first train A preceeds the train 205, the pre-existing images may be captured by an EOT device on the first train. Each of the one or more pre-existing images corresponds to a status of the barrier gate 257. The at least one image of the barrier gate 257 is compared with the one or more pre-existing images to determine the current status of the barrier gate 257. The images may be compared using a predefined algorithm. The predefined algorithm may compute a similarity index for a given pair of images. If the similarity index is less than a predefined threshold, the status of the barrier gate 257 is different from the status associated with the pre-existing image. For example, the image captured by the EOT device 210 may correspond to a position other than closed, and the pre-existing image may indicate a closed position of the barrier gate 257.

In another embodiment, the image data is provided as input to a pose estimation algorithm for identifying the position of the barrier gate 257. The pose estimation algorithm uses a trained artificial intelligence model. The artificial intelligence model is trained, during a learning phase, based on a plurality of images, each of which correspond to a position of the barrier gate 257. The artificial intelligence model may be trained based on supervised learning techniques or unsupervised learning techniques. In another embodiment, the pose estimation algorithm may use a genetic algorithm.

At act 315, an action to be performed is identified based on the current status of the barrier gate 257. More specifically, an action is identified if the current status of the barrier gate 257 is not 'closed'. In one embodiment, the action is associated with correcting a position of the barrier gate 257. In another embodiment, the action is associated with notifying the current status to an electronic device (not shown) associated with a gate operator of the barrier gate 257. Non-limiting examples of electronic devices include, a personal digital assistant, a mobile phone, and a workstation.

At act 320, one or more instructions for performing the identified action are generated. In an embodiment, the generated instructions are further transmitted to the control station 235 associated with the barrier gate 257. The control station 235 associated with the barrier gate 257 is identified based on a location of the train. For example, the control station closest to the barrier gate 257 may be identified. In another example, the control station 235 may be identified based on the identity of the barrier gate 257, from the database. The instructions may be directly transmitted to the control station 235 for execution. In another embodiment, the remote server 225 transmits the instructions to the EOT device 210. The EOT device 210 retransmits the instructions to the HOT device 215. Subsequently, the HOT device 215 transmits the instructions to the control station 235 for execution.

In one embodiment, the instructions are associated with correcting the position of the barrier gate 257. The instructions may be associated with providing a corrective input to a gate motor controller associated with the barrier gate 257 through an Operations Control System (OCS). In another embodiment, the status of the barrier gate 257 is notified to an operator in the control station 235 by an alarm or a visual indication on the OCS. The operator may further contact a gate operator associated with the barrier gate 257 to manually check the operation of the barrier gate 257 for faults. In yet another embodiment, the instructions are associated with generating a notification indicating the position of the barrier gate 257 and transmitting the notification to the electronic device of the gate operator. For example, the notification may indicate that manual intervention is required in opening or for performing maintenance on the barrier gate 257. The remote server 225 may also transmit the notification directly to the electronic device of the gate operator. The gate operator may further manually check the barrier gate 257, associated track circuitry, or control circuitry for faults.

It is to be understood by a person skilled in the art that the functions of the remote server 225 may be performed by a subsystem onboard the train 205. In an embodiment, the subsystem may be a unit onboard the train 205. In an embodiment, an EOT device is adapted to perform the functions of the remote server 225 in addition to the functions of the EOT device 210 described herein. In another embodiment, a HOT device is adapted to perform one or more functions of the remote server 225. In an implementation, the HOT device is adapted to receive images via a radio channel using a standard or customized communication protocol.

The present embodiments facilitate remote monitoring of barrier gates with the help of imaging devices mounted on trains. Consequently, the present embodiments may be employed for monitoring operation of unmanned level crossings and for scheduling maintenance of the barrier gate if the operation is found to be faulty.

While embodiments of the present invention have been disclosed in exemplary forms, it will be apparent to those skilled in the art that many modifications, additions, and deletions may be made therein without departing from the spirit and scope of the invention and its equivalents, as set forth in the following claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An end-of-train device comprising:
   an imaging device configured to capture at least one image associated with a barrier gate in a vicinity of a train on which the end-of-train device is mounted;
   a processing unit configured to:
      identify acceleration data associated with the train;
      preprocess the at least one image based on the acceleration data associated with the train;
      determine whether the barrier gate is present in an image of the at least one image associated with the barrier gate; and
      select the image for transmission to a remote server when, based on the determination, the barrier gate is present in the image, wherein the image is configured to be analyzed to determine a current status of the barrier gate; and
   a location tracking device configured to determine a location of the train in real- time,
   wherein the processing unit is further configured to determine an identity of the barrier gate using the location of the train.

2. The end-of-train device of claim 1, further comprising a first memory,
   wherein the processing unit is further configured to execute one or more instructions stored in the first memory, for preprocessing the at least one image associated with the barrier.

3. The end-of-train device of claim 1, further comprising:
   a communication unit configured to transmit the image and the location of the train to the remote server.

4. The end-of-train device of claim 1, further comprising an accelerometer configured to generate the acceleration data, the accelerometer being in communication with the processing unit.

5. The end-of-train device of claim 1, wherein the processing unit is further configured to trigger the capture of the at least one image associated with the barrier based on the determined location of the train and a location corresponding to the determined identity of the barrier gate.

6. A system for monitoring barrier gates, the system comprising:
   an imaging device mounted on a train, wherein the imaging device is configured to capture images associated with an environment of the train;
   a subsystem communicatively coupled to the imaging device, configured via executable instructions to:
      receive at least one image associated with a barrier gate from the imaging device;
      identify acceleration data associated with the train;
      preprocess the at least one image based on the acceleration data associated with the train;
      analyze the at least one image to determine a current status of the barrier gate, wherein the current status corresponds to a position associated with the barrier gate;
      identify an action to be performed based on the current status of the barrier gate; and generate one or more instructions for performing the identified action,
wherein the analysis of the at least one image comprises:
determination of an identity of the barrier gate based on a location of the train;
identification of one or more pre-existing images associated with the barrier gate, from a database, based on the identity of the barrier gate, wherein each of the one or more pre-existing images corresponds to a status of the barrier gate; and
comparison of the at least one image associated with the barrier gate with the one or more pre-existing images, such that the current status of the barrier gate is determined.

7. The system of claim 6, wherein the subsystem is further configured to:
identify a control station associated with the barrier gate based on the location of the train; and
transmit the generated one or more instructions to the identified control station for execution.

8. The system of claim 7, further comprising a location tracking device configured to provide the location of the train in real-time to the subsystem.

9. The system of claim 6, wherein the subsystem is a remote server.

10. The system of claim 6, wherein the subsystem is a Head-of-Train device.

11. The system of claim 6, wherein the action comprises correction of the position associated with the barrier gate.

12. The system of claim 6, wherein the action comprises transmission of a notification indicating the current status to an electronic device associated with an operator of the barrier gate.

13. A method for monitoring barrier gates, the method comprising:
receiving, by a processing unit, at least one image associated with a barrier gate, wherein the at least one image is received from an imaging device mounted on a train;
identifying acceleration data associated with the train;
preprocessing the at least one image based on the acceleration data associated with the train;
determining a current status of the barrier gate, the determining of the current status of the barrier gate comprising analyzing, by the processing unit, the at least one image, wherein the current status corresponds to a position associated with the barrier gate;
identifying, by the processing unit, an action to be performed based on the current status of the barrier gate; and
generating, by the processing unit, one or more instructions for performing the identified action,
wherein analyzing the at least one image comprises:
determining an identity of the barrier gate based on a location of the train;
identifying one or more pre-existing images associated with the barrier gate, from a database, based on the identity of the barrier gate, wherein each of the one or more pre-existing images corresponds to a status of the barrier gate; and
comparing the at least one image associated with the barrier gate with the one or more pre-existing images to determine the current status of the barrier gate.

14. The method of claim 13, further comprising:
identifying a control station associated with the barrier gate based on the location of the train; and
transmitting the generated one or more instructions to the identified control station for execution.

15. The method of claim 13, wherein the action comprises correcting the position associated with the barrier gate.

16. The method of claim 13, wherein the action comprises notifying the current status of the barrier gate to an operator of the barrier gate.

17. A train comprising:
an end-of-train device comprising:
an imaging device configured to capture at least one image associated with a barrier gate in a vicinity of a train on which the end-of-train device is mounted;
a processing unit configured to:
identify acceleration data associated with the train;
preprocess the at least one image based on the acceleration data associated with the train;
determine whether the barrier gate is present in an image of the at least one image associated with the barrier gate; and
select the image for transmission to a remote server when, based on the determination, the barrier gate is present in the image, wherein the image is configured to be analyzed to determine a current status of the barrier gate; and
a location tracking device configured to determine a location of the train in real-time,
wherein the processing unit is further configured to determine an identity of the barrier gate using the location of the train.

* * * * *